United States Patent [19]

Furukawa et al.

[11] Patent Number: 5,108,851
[45] Date of Patent: Apr. 28, 1992

[54] METAL-HYDROGEN ALKALINE STORAGE CELL

[75] Inventors: Nobuhiro Furukawa, Hirakata; Masao Takee, Nishinomiya; Tadashi Ise, Osaka, all of Japan

[73] Assignee: Sanyo Electric Co., Ltd., Moriguchi, Japan

[21] Appl. No.: 756,496

[22] Filed: Sep. 9, 1991

[30] Foreign Application Priority Data

Apr. 17, 1991 [JP] Japan ................ 3-85112

[51] Int. Cl.⁵ .......................... H01M 10/52
[52] U.S. Cl. ...................... 429/59; 429/101; 429/218; 420/900
[58] Field of Search ............ 429/101, 59, 57, 218, 429/223, 206, 209; 420/900, 83, 416; 252/182.1

[56] References Cited

U.S. PATENT DOCUMENTS

| | | | |
|---|---|---|---|
| 3,959,018 | 5/1976 | Dunlop et al. | 429/40 |
| 4,621,034 | 11/1986 | Kanda et al. | 429/59 |
| 4,623,597 | 11/1986 | Sapru et al. | 429/101 |
| 4,696,873 | 9/1987 | Yagasaki et al. | 429/59 |
| 4,728,586 | 3/1988 | Venkatesan et al. | 429/209 X |
| 4,898,794 | 2/1990 | Doi et al. | 429/101 X |
| 4,983,474 | 1/1991 | Doi et al. | 429/101 X |
| 5,006,328 | 4/1991 | Hong | 429/218 X |

*Primary Examiner*—Anthony Skapars
*Attorney, Agent, or Firm*—Morrison Law Firm

[57] ABSTRACT

A metal-hydrogen alkaline storage cell comprising a rare earth hydrogen absorbing alloy and positive and negative electrodes, wherein the rare earth hydrogen absorbing alloy contains praseodymium in a weight ratio of no more than about 3 weight percent based on the total weight of rare earth elements.

12 Claims, 3 Drawing Sheets

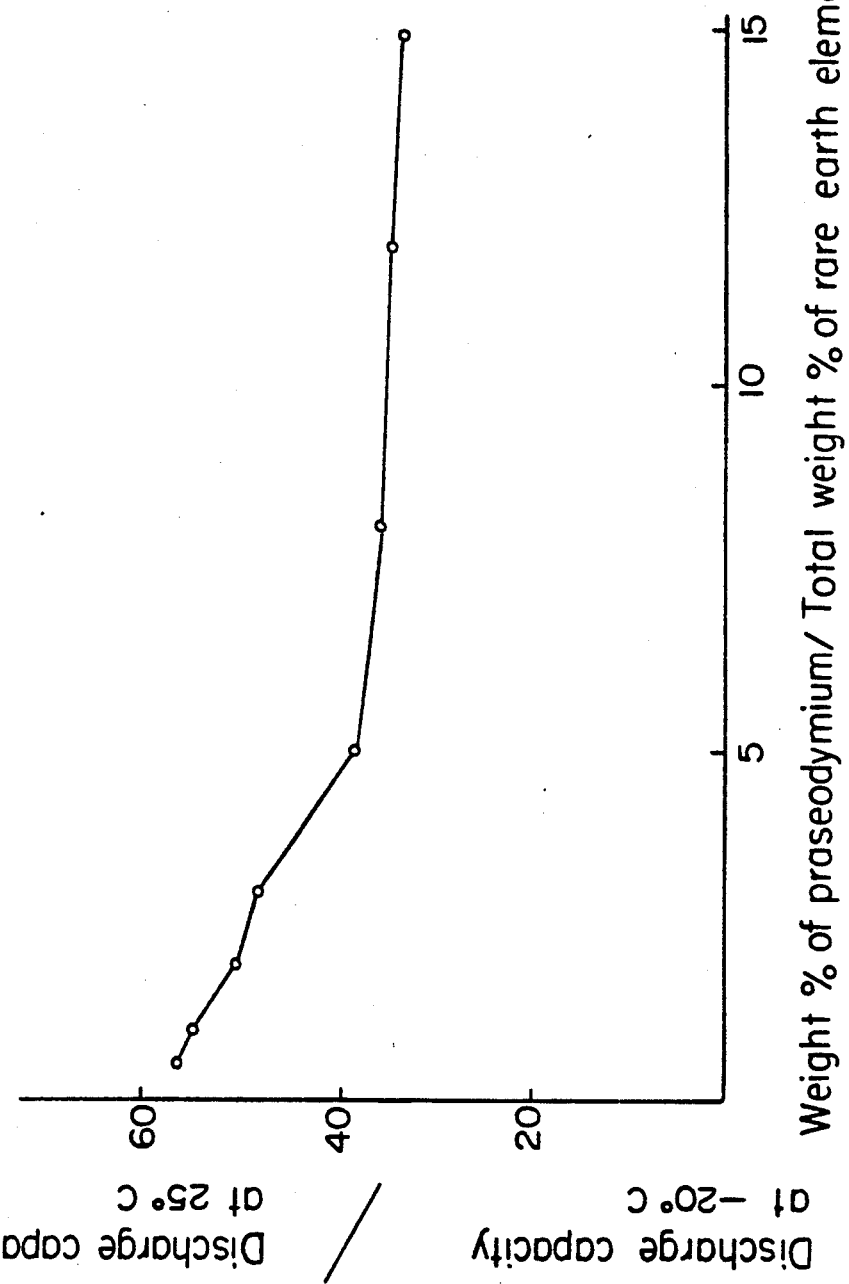

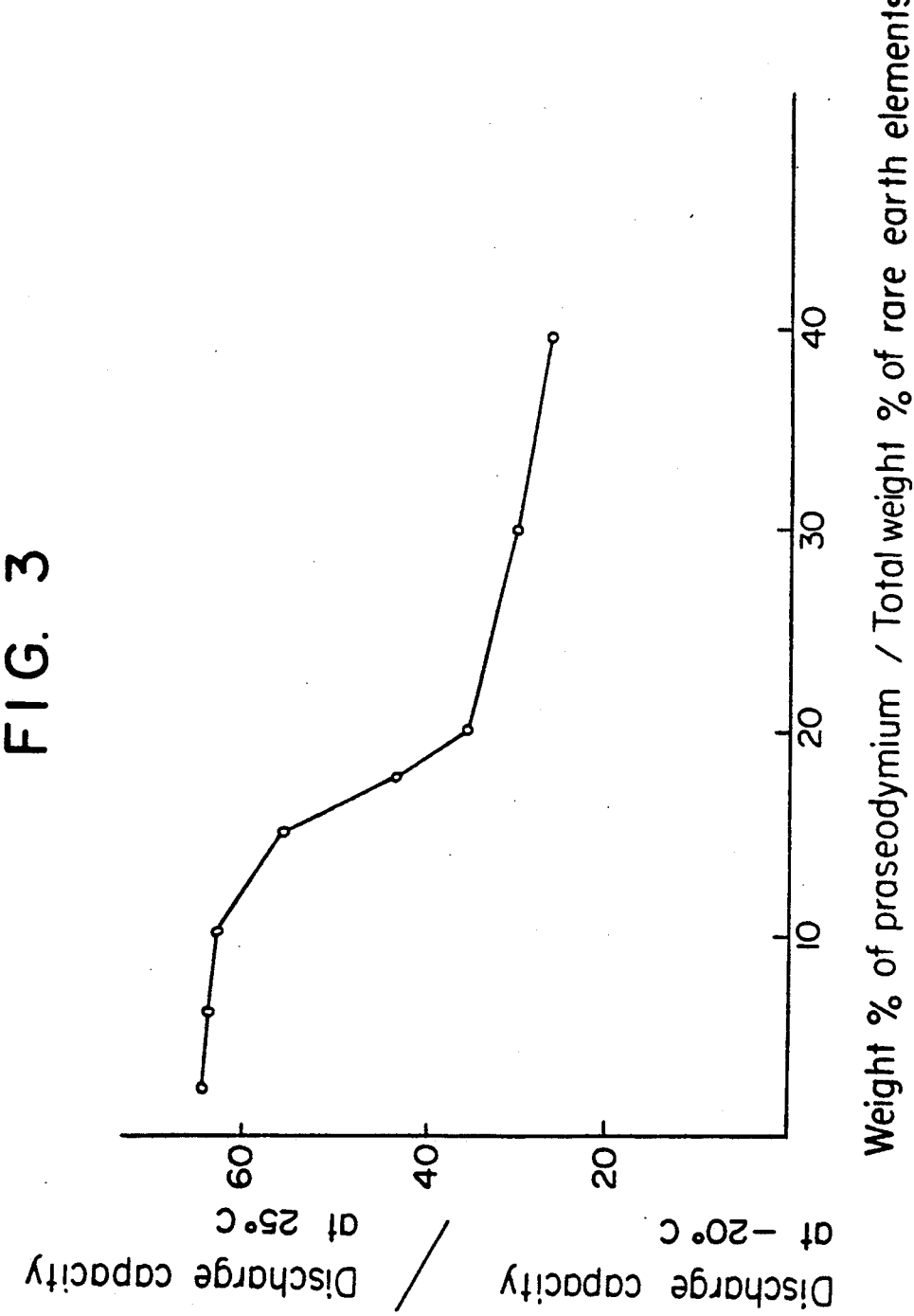

METAL-HYDROGEN ALKALINE STORAGE CELL

BACKGROUND OF THE INVENTION

This invention relates to a metal-hydrogen alkaline storage cell comprising a rare earth hydrogen absorbing alloy, said cell including a positive electrode and a negative electrode.

In recent years, attention has been paid to a new type of alkaline storage cell which can be substituted for a conventional nickel-cadmium battery, since the former has a higher energy density than the latter. The negative electrode of the alkaline storage cell is made of any hydrogen absorbing alloy belonging to various rare earth groups such as $AB_5$ group, $AB_2$ or the like. As the rare earth group forming the foregoing "A" element, an inexpensive misch metal (Mm) is generally used, which is a mixture of lanthanum (La), cerium (Ce), neodymium (Nd), praseodymium (Pr), and the like. The mixture contains Nd in amounts of from about 16 to about 18 weight % and Pr in amounts of from about 5 to about 15 weight %.

When the metal-hydrogen alkaline storage cell uses the misch metal containing the foregoing materials, the problem is that it becomes difficult to absorb and desorb hydrogen in the beginning of a charge/discharge cycle. Since no activation is available in that beginning, the charge/discharge property (in particular, a high efficient discharge property at a lower temperature) is deteriorated.

OBJECTS AND SUMMARY OF THE INVENTION

Accordingly, it is a main object of this invention to provide a metal-hydrogen alkaline storage cell which enables a greater improvement of the charge/discharge property in the beginning of its cycle.

It is a further object of this invention to provide a metal-hydrogen alkaline storage cell which enables a greater improvement of the high rate discharge property at a lower temperature in the beginning of its cycle.

Briefly stated, the present invention provides a metal-hydrogen alkaline storage cell comprising:

a rare earth hydrogen absorbing alloy;

a positive electrode and a negative electrode; and wherein said rare earth hydrogen absorbing alloy contains praseodymium in a weight ratio of no more than about 3 weight percent based on total weight of rare earth elements.

According to another embodiment of this invention, there is provided a metal-hydrogen alkaline storage cell comprising:

a rare earth hydrogen absorbing alloy;

a positive electrode and a negative electrode; and wherein said rare earth hydrogen absorbing alloy contains neodymium in a weight ratio of no more than about 15 weight percent based on the total weight of rare earth elements.

According to a further embodiment of this invention, there is provided a metal-hydrogen alkaline storage cell comprising:

a rare earth hydrogen absorbing alloy;

a positive electrode electrode and a negative; and wherein said rare earth hydrogen absorbing alloy contains praseodymium and neodymium, in which the weight ratio of praseodymium is no more than about 3 weight percent based on total weight of rare earth elements and that of neodymium is no more than about 15 weight percent therein.

In the present invention it has been found that since neodymium and praseodymium are harder than the other rare earth elements such as lanthanum, cerium, and the like, they have a difficult crack forming and are susceptible of oxidation, thereby a surface of the alloy is oxidated. In order to overcome the foregoing disadvantages, the weight % of praseodymium and neodymium respectively has been defined as above.

Thus, the hydrogen absorbing alloy is susceptible of forming certain cracks from the beginning of the charge/discharge cycle, and a surface of the hydrogen absorbing alloy is protected from corrosion. Accordingly, it becomes possible to absorb and desorb hydrogen even in the beginning of the cycle, thereby the charge/discharge property (in particular, a high rate discharge property at a lower temperature) can be improved greatly.

BRIEF DESCRIPTION OF THE DRAWINGS

FIG. 2 is a graph showing a relationship between the weight % of praseodymium vs. the discharge capacity at $-20°$ C./the discharge capacity at $25°$ C. in the beginning of its cycle.

FIG. 3 is a graph showing a relationship between the weight % of neodymium vs. the discharge capacity at $-20°$ C./the discharge capacity at $25°$ C.

DETAILED DESCRIPTION OF THE PREFERRED EMBODIMENT

Figure 1:
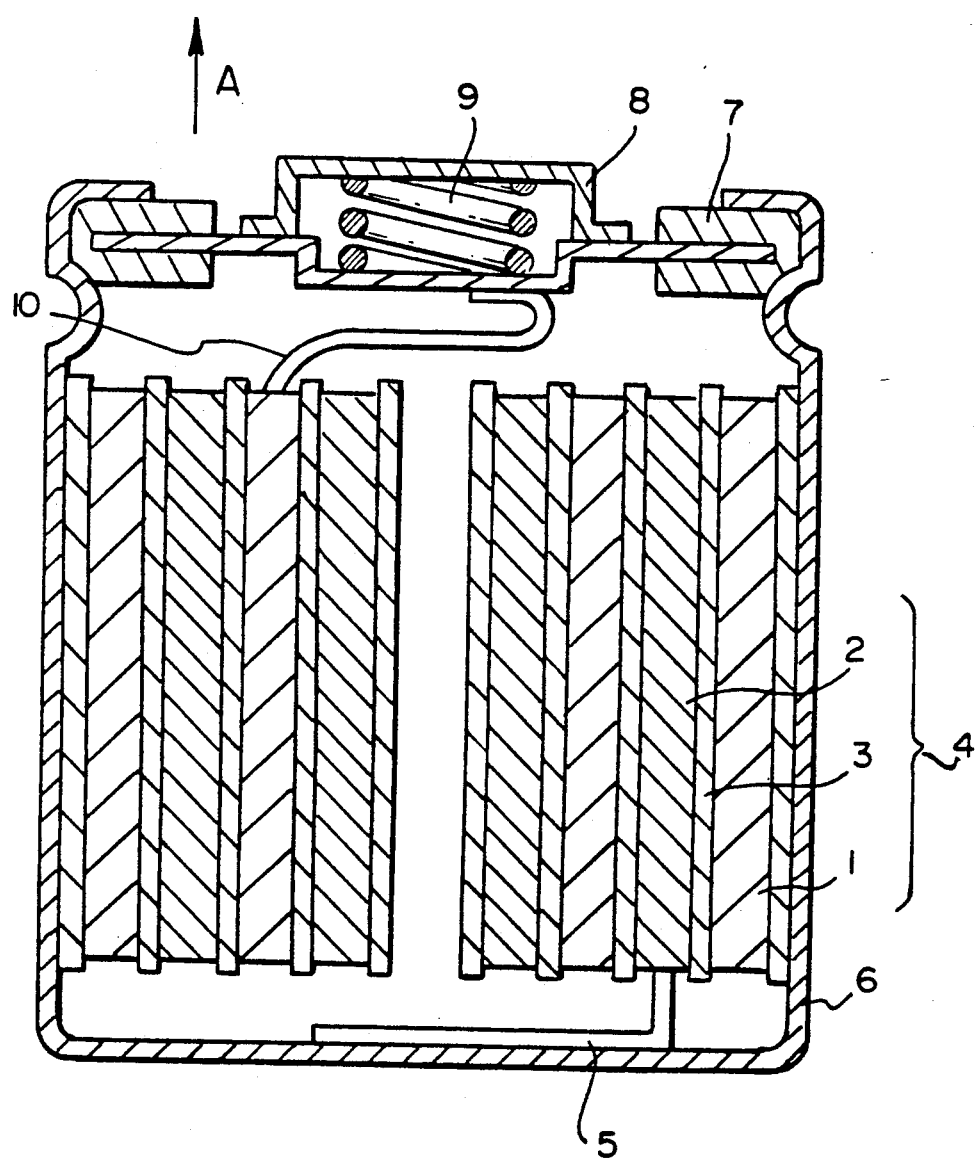
FIG. 1 is a section view of an example of a cylindrical type nickel-hydrogen alkaline storage cell according to this invention.

FIG. 1 shows a section view of an example of the nickel-hydrogen alkaline storage cell (capacity: 1000 mAh) according to this invention, which constitutes a volutely coiled electrode group 4 comprising a positive electrode 1 made of a sintered nickel, a negative electrode 2 including a hydrogen absorbing alloy and a separator 3 inserted between the foregoing two electrodes. Electrode group 4 is disposed inside an external container 6 having the function of a terminal of the negative electrode 2. The negative electrode 2 and the external container 6 are connected to each other by means of a conducting tab 5 for the negative electrode. A sealing member 8 is disposed on an upper opening of external container 6 by way of a packing 7, and a coil spring 9 is disposed inside sealing member 8. When an internal pressure in the storage cell is increased abnormally, coil spring 9 is urged in a direction of an arrow A, thereby a certain gas therein is discharged to an atmosphere. The sealing member 8 and positive electrode 1 are connected to each other by means of a conducting tab 10 for the positive electrode.

EXAMPLES

Example 1

The foregoing cylindrical type nickel-hydrogen alkaline storage cell was prepared as follows:

First, an ore was dissolved and each rare earth element was ionized. Then, praseodymium and neodymium were selectively extracted by using a preferred solvent. Subsequently, the extract was treated by an electrolytic reduction, thereby there was prepared a misch metal (namely, a mixture of rare earth elements) containing 2 weight % praseodymium and 10 weight % of neodymium out of all rare earth elements. The weight ratio of lanthanum vs. cerium in the misch metal was 1:2, that is, 29.3 weight %: 58.7 weight %.

Subsequently, misch metal (Mm), Ni, Co, Al and Mn were prepared so that their weight ratio was 1:3.3:1:0.3:0.4, and were all dissolved in a high frequency melting furnace. Then, the dissolved liquid was cooled, thereby an alloy ingot of Mm Ni$_{3.3}$ Co Al$_{0.3}$ Mn$_{0.4}$ was prepared. The alloy ingot was pulverized so that each pulverized particle was to be no more than 50 microns in diameter.

Following this step, 5 weight % of polytetrafluoroethylene powder as a binder was added to the hydrogen absorbing alloy powder, and admixed therewith, producing a paste.

Then, the paste was pressed on both sides of a punched metal collector to prepare negative electrode 2.

Following this step, negative electrode 2 and sintered positive electrode 1 having a much higher capacity than negative electrode 2 were wound with separator 3 therebetween, separator 3 being made of an unwoven fabric, so that electrode group 4 was produced. Then, electrode group 4 was inserted in external container 6, and 30 weight % of KOH solution was poured into external container 6. The cylindrical type nickel-hydrogen storage cell (hereinafter called "A$_1$" storage cell) according to this invention was prepared by sealing external container 6.

Example 2

The procedure of Example 1 was exactly repeated except that the ratio of praseodymium was 5 weight %. The weight ratio of lanthanum vs. cerium in the misch metal was 1:2 (namely, 28.3 weight %: 56.7 weight %). The thus prepared storage cell was called "A$_2$" storage cell.

Example 3

The procedure of Example 1 was exactly repeated except that the ratio of neodymium was 20 weight %. The weight ratio of lanthanum vs. cerium in the misch metal was 1:2 (26 weight %: 52 weight %). The thus prepared storage cell was called "A$_3$" storage cell.

Comparative Example

The procedure of Example 1 was exactly repeated except that the ratio of neodymium in this Comparative Example was 20 weight % and that of praseodymium 5 weight %. The weight ratio of lanthanum vs cerium was 1:2 (25 weight %: 50 weight %). The thus prepared storage cell was called "X" storage cell.

Experiment 1

With regard to the storage cells A$_1$ to A$_3$ and Comparison X, the ratio of the discharge capacity at $-20°$ C. and that at 25° C. were examined in the beginning of the charge/discharge cycle. Table 1 shows the results.

Each of the foregoing storages was fully charged at $-20°$ C. and 25° C. respectively, and then discharged with a discharge current of 1.0 C. until the discharge voltage ends at 1.0 V. Table 1 shows the values of a second cycle.

| Kinds of Storage Cell | Weight % of respective rare earth elements | | | | Discharge Capacity at $-20°$ C./ Discharge Capacity at 25° C. |
|---|---|---|---|---|---|
| | Nd | Pr | La | Ce | |
| A$_1$ | 10 | 2 | 29.3 | 58.7 | 69 |
| A$_2$ | 10 | 5 | 28.3 | 56.7 | 55 |
| A$_3$ | 20 | 2 | 26 | 52 | 50 |
| X | 20 | 5 | 25 | 50 | 35 |

As shown in Table 1, it is to be understood that the ratio of the discharge capacity at $-20°$ C./25° C. in each of the storage cells A$_1$ to A$_3$ according to this invention is increased greater than that in the storage cell in Comparison X. In particular, the ratio in the storage cell A$_1$ containing 10 weight % of neodymium and 2 weight % of praseodymium was remarkably increased.

Experiment 2

The misch metal used in Experiment 2 was characterized in that the ratio of neodymium in the whole of rare earth elements was 15 weight %, while that of praseodymium therein was 0.5 weight %, 1 weight %, 2 weight %, 3 weight %, 5 weight %, 8 weight %, 12 weight % and 15 weight %, respectively. Cells were prepared in the same way as in Example 1.

FIG. 2 shows the ratio of the discharge capacity at $-20°$ C./25° C. in respective storage cells prepared in Experiment 2. The experimental conditions were the same as Experiment 1.

As clearly shown in FIG. 2, it is to be understood that when the ratio of praseodymium in the whole of the rare earth elements was set to 3 weight % or less, the ratio of the discharge capacity at $-20°$ C./25° C. was greatly increased. Accordingly, the foregoing ratio of praseodymium was necessary.

Experiment 3

The misch metal used in Experiment 3 was characterized in that the ratio of praseodymium in the whole of the rare earth elements was 3 weight %, while that of neodymium therein was 2 weight %, 6 weight %, 10 weight %, 15 weight %, 18 weight %, 20 weight %, 30 weight % and 40 weight %, respectively. Cells were prepared in the same way as in Example 1.

FIG. 3 shows the ratio of the discharge capacity at $-20°$ C./25° C. in respective storage cells prepared in Experiment 3. The experimental conditions were the same as those in Experiment 1.

As clearly shown in FIG. 3, it is to be understood that when the ratio of neodymium in the whole of the rare earth elements was set to 15% or less, the ratio of the discharge capacity at $-20°$ C./25° C. was greatly increased. Accordingly, the foregoing ratio of neodymium was necessary.

In the foregoing examples, Mm Ni$_{3.3}$ Co Al$_{0.3}$ Mn$_{0.4}$ as the hydrogen absorbing alloy was used, but any hydrogen absorbing alloy using other rare earth is of course applicable.

What is claimed is:

1. A metal-hydrogen alkaline storage cell comprising:
   a rare earth hydrogen absorbing alloy;
   a positive electrode and a negative electrode; wherein said rare earth hydrogen absorbing alloy contains praseodymium in a weight ratio of no more than about 3 weight percent based on the total weight of rare earth elements.

2. A metal-hydrogen alkaline storage cell as defined in claim 1, in which said positive electrode comprises a sintered nickel.

3. A metal-hydrogen alkaline storage cell as defined in claim 1, in which said rare earth hydrogen absorbing alloy contains a misch metal.

4. A metal-hydrogen alkaline storage cell as defined in claim 3, in which respective rare earth elements of said misch metal are ionized by dissolving an ore thereof, and then praseodymium is selectively extracted and electrolytic-reduced.

5. A metal-hydrogen alkaline storage cell comprising:
a rare earth hydrogen absorbing alloy;
a positive electrode and a negative electrode; and
wherein said rare earth hydrogen absorbing alloy contains neodymium in a weight ratio of no more than about 15 weight percent based on the total weight of rare earth elements.

6. A metal-hydrogen alkaline storage cell as defined in claim 5, in which said positive electrode comprises a sintered nickel.

7. A metal-hydrogen alkaline storage cell as defined in claim 5, in which said rare earth hydrogen absorbing alloy contains a misch metal.

8. A metal-hydrogen alkaline storage cell as defined in claim 7, in which respective rare earth elements of said misch metal are ionized by dissolving an ore thereof, and then neodymium is selectively extracted and electrolytic-reduced.

9. A metal-hydrogen alkaline storage cell comprising:
a rare earth hydrogen absorbing alloy;
a positive electrode and a negative electrode; and
wherein said rare earth hydrogen absorbing alloy contains praseodymium and neodymium, in which the weight ratio of praseodymium is no more than about 3 weight percent based on the total weight of rare earth elements, and that of neodymium is no more than about 15 weight percent therein.

10. A metal-hydrogen alkaline storage cell as defined in claim 9, in which said positive electrode comprises a sintered nickel.

11. A metal-hydrogen alkaline storage cell as defined in claim 9, in which said rare earth hydrogen absorbing alloy contains a misch metal.

12. A metal-hydrogen alkaline storage cell as defined in claim 11, in which respective rare earth elements of said misch metal are ionized by dissolving an ore thereof, and then praseodymium and neodymium are extracted and electrolytic-reduced.

* * * * *